(12) United States Patent
Cantin et al.

(10) Patent No.: US 7,747,825 B2
(45) Date of Patent: *Jun. 29, 2010

(54) METHOD, APPARATUS, AND COMPUTER PROGRAM PRODUCT FOR A CACHE COHERENCY PROTOCOL STATE THAT PREDICTS LOCATIONS OF SHARED MEMORY BLOCKS

(75) Inventors: Jason Frederick Cantin, Madison, WI (US); Steven R. Kunkel, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 108 days.

This patent is subject to a terminal disclaimer.

(21) Appl. No.: 12/107,350

(22) Filed: Apr. 22, 2008

(65) Prior Publication Data
US 2008/0215819 A1    Sep. 4, 2008

Related U.S. Application Data

(62) Division of application No. 11/184,315, filed on Jul. 19, 2005, now Pat. No. 7,395,376.

(51) Int. Cl.
G06F 12/00 (2006.01)
G06F 13/00 (2006.01)
G06F 13/28 (2006.01)

(52) U.S. Cl. ...................................... 711/141
(58) Field of Classification Search ........................ None
See application file for complete search history.

(56) References Cited

U.S. PATENT DOCUMENTS

| 5,394,555 A | 2/1995 | Hunter et al. |
|---|---|---|
| 5,862,357 A | 1/1999 | Hagersten et al. |
| 5,878,268 A | 3/1999 | Hagersten |
| 6,115,804 A | 9/2000 | Carpenter et al. |
| 6,516,391 B1 | 2/2003 | Tsushima et al. |
| 2003/0009643 A1 | 1/2003 | Arimilli et al. |
| 2003/0131200 A1 | 7/2003 | Berg et al. |
| 2004/0059877 A1 | 3/2004 | Brown et al. |
| 2004/0230751 A1 | 11/2004 | Blake et al. |
| 2005/0060499 A1 | 3/2005 | Gilbert et al. |
| 2006/0090041 A1 | 4/2006 | Nakagawa |
| 2007/0022255 A1 | 1/2007 | Cantin et al. |
| 2007/0022256 A1 | 1/2007 | Cantin et al. |

Primary Examiner—Christian P Chace
Assistant Examiner—Gary W Cygiel
(74) Attorney, Agent, or Firm—Yee & Associates, P.C.; Diana R. Gerhardt

(57) ABSTRACT

A method, apparatus, and computer program product are disclosed for reducing the number of unnecessarily broadcast local requests to reduce the latency to access data from remote nodes in an SMP computer system. A shared invalid cache coherency protocol state is defined that predicts whether a memory read request to read data in a shared cache line can be satisfied within a local node. When a cache line is in the shared invalid state, a valid copy of the data is predicted to be located in the local node. When a cache line is in the invalid state and not in the shared invalid state, a valid copy of the data is predicted to be located in one of the remote nodes.

Memory read requests to read data in a cache line that is not currently in the shared invalid state are broadcast first to remote nodes. Memory read requests to read data in a cache line that is currently in the shared invalid state are broadcast first to a local node, and in response to being unable to satisfy the memory read requests within the local node, the memory read requests are broadcast to the remote nodes.

8 Claims, 7 Drawing Sheets

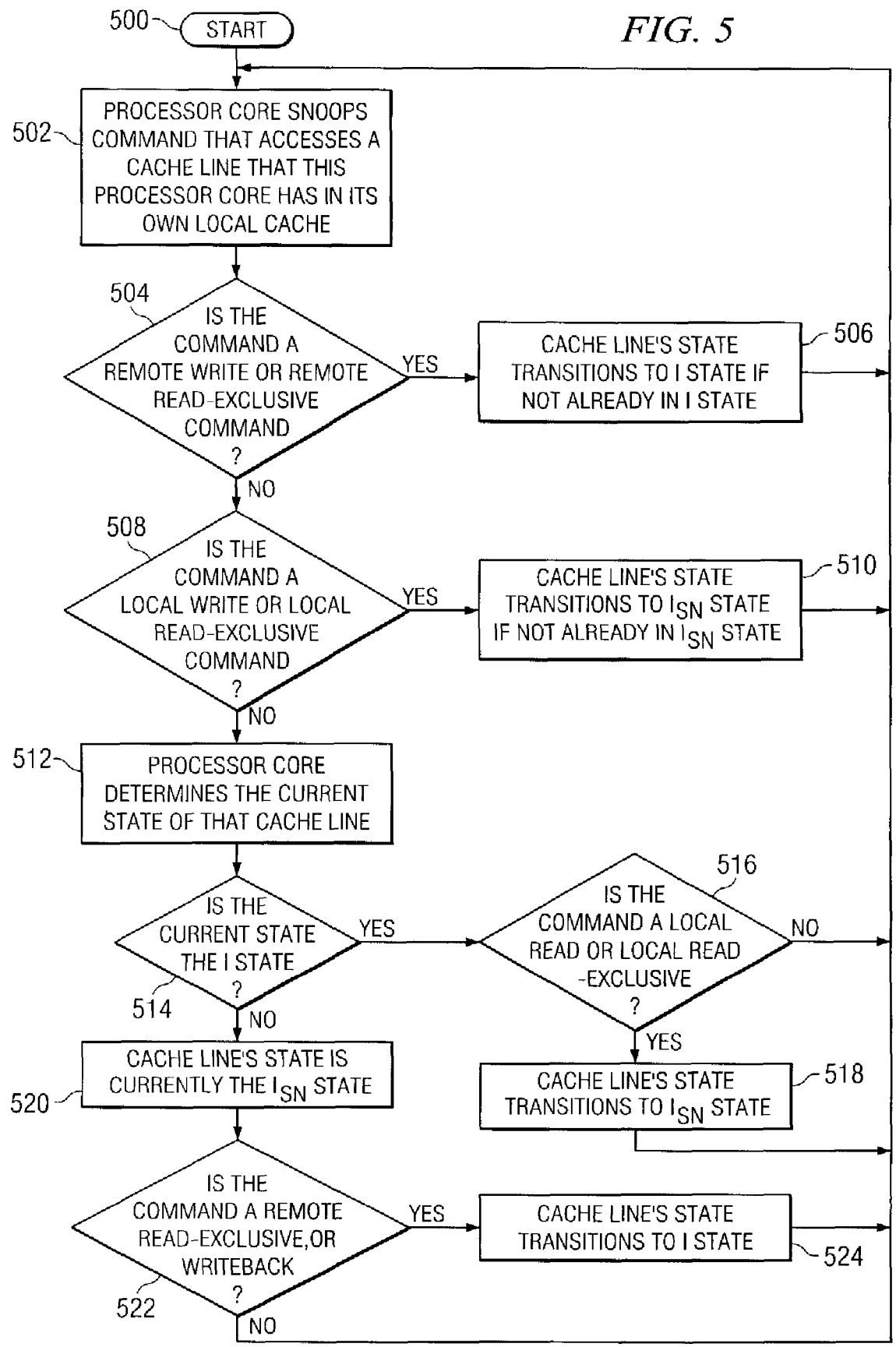

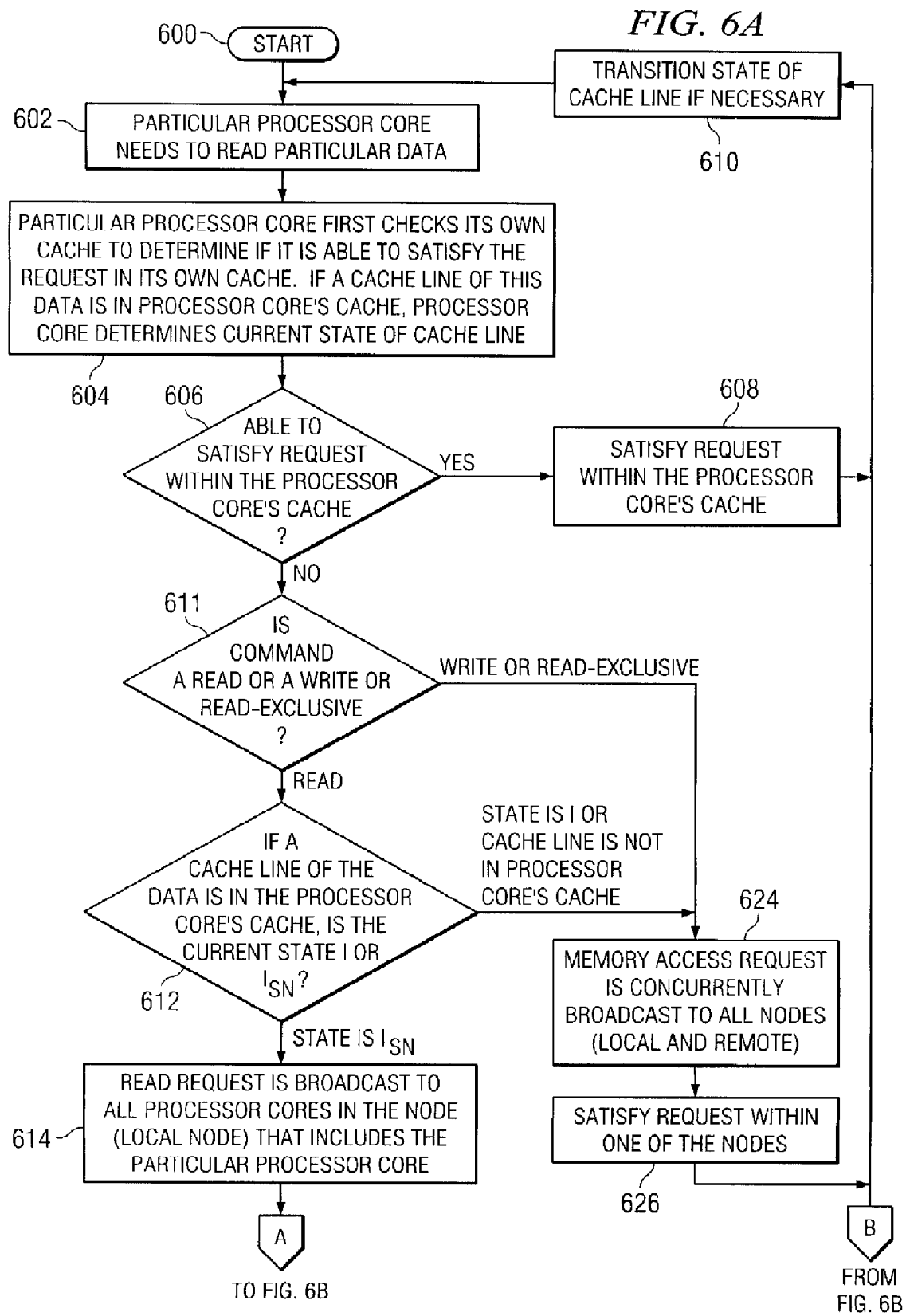

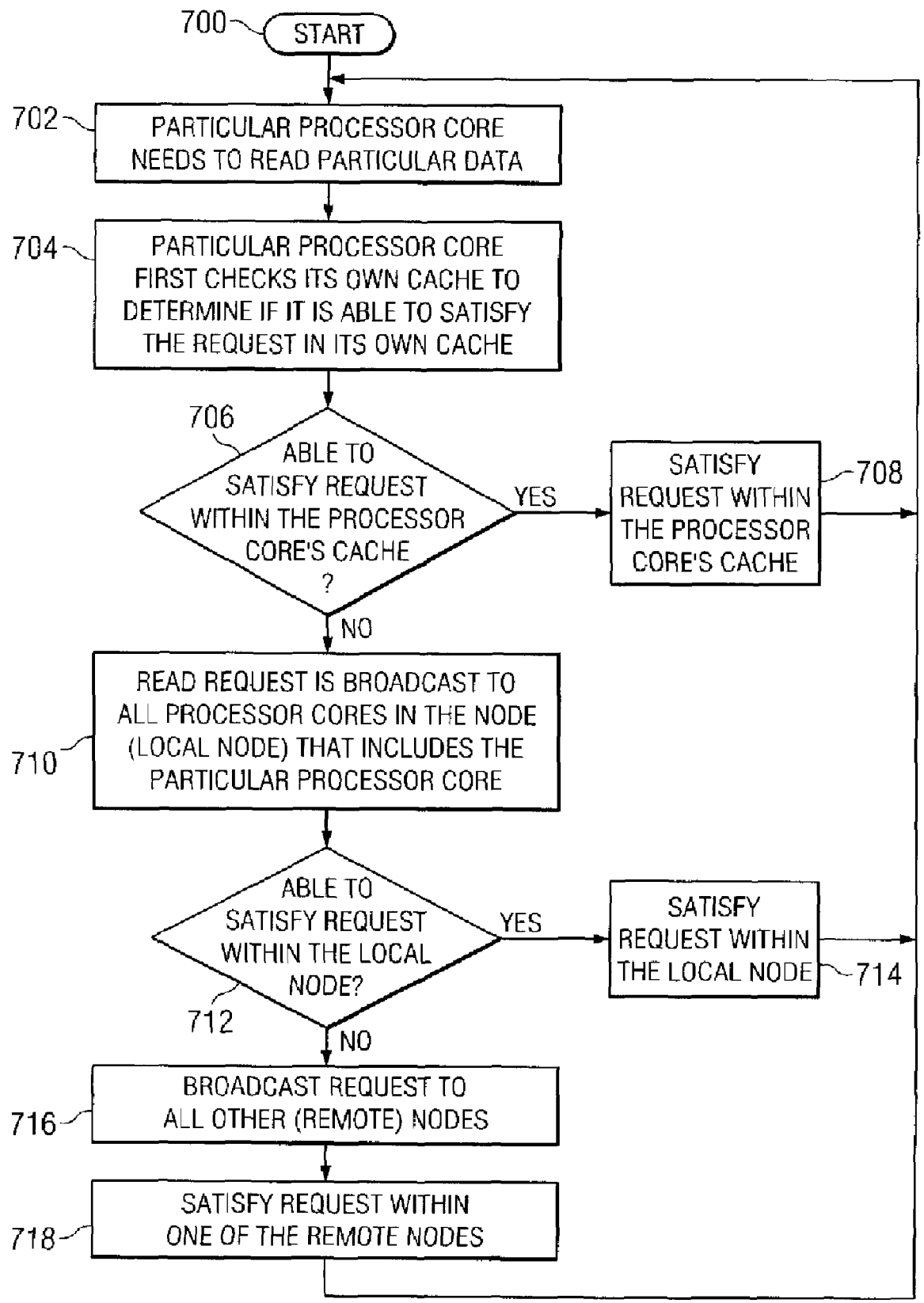

METHOD, APPARATUS, AND COMPUTER PROGRAM PRODUCT FOR A CACHE COHERENCY PROTOCOL STATE THAT PREDICTS LOCATIONS OF SHARED MEMORY BLOCKS

This application is a divisional of application Ser. No. 11/184,315, filed Jul. 19, 2005 now U.S. Pat. No. 7,395,376, status pending.

BACKGROUND OF THE INVENTION

1. Field of the Invention

The present invention is directed to data processing systems. More specifically, the present invention is directed to a method, apparatus, and computer program product that provides an additional cache coherency protocol state that predicts the location of a shared memory block.

2. Description of the Related Art

A conventional symmetric multiprocessor (SMP) computer system, such as a server computer system, includes multiple nodes coupled together using a system interconnect that typically comprises one or more system address, data, and control buses. Commands can be transmitted from one node to another by being broadcast on the system interconnect.

Each node typically includes multiple processing units all coupled to the local node interconnect, which typically comprises one or more address, data, and control buses. Coupled to the node interconnect is a system memory, which represents the lowest level of volatile memory in the multiprocessor computer system and which generally is accessible for read and write access by all processing units. In order to reduce access latency to instructions and data residing in the system memory, each processing unit is typically further supported by a respective multi-level cache hierarchy, the lower level(s) of which may be shared by one or more processor cores.

Because multiple processor cores may request write access to a same cache line of data and because modified cache lines are not immediately synchronized with system memory, the cache hierarchies of multiprocessor computer systems typically implement a cache coherency protocol to ensure at least a minimum level of coherence among the various processor core's "views" of the contents of system memory. In particular, cache coherency requires, at a minimum, that after a processing unit accesses a copy of a memory block and subsequently accesses an updated copy of the memory block, the processing unit cannot again access the old copy of the memory block.

A cache coherency protocol typically defines a set of cache states stored in association with the cache lines of each cache hierarchy, as well as a set of coherency messages utilized to communicate the cache state information between cache hierarchies. In a typical implementation, the cache state information takes the form of the well-known MESI (Modified, Exclusive, Shared, Invalid) protocol, and the coherency messages indicate a protocol-defined coherency state transition in the cache hierarchy of the requester and/or the recipients of a memory access request.

A memory access request is a request to access data within the computer system. The memory access request can be a request to either read or write the particular data. The memory access request includes an address which identifies the particular data to be accessed.

Several copies of the data may exist concurrently within a computer system. These copies may include a slightly different version of the data. The cache coherence protocol is a process for, among other things, tracking which copy of the data is currently valid. Each copy of the data is referred to herein as either a memory block or a cache line. The cache coherence protocol dictates which cache coherence protocol state is associated with each cache line. Therefore, at any given time, each cache line is in one of the cache coherence protocol "states".

As described above, processor cores in an SMP computer system are clustered into nodes. Each node typically includes multiple processor cores. Two-level cache coherence protocols exploit the clustering of processor cores to conserve global bandwidth by broadcasting read requests to the local node first, and only sending the requests to remote nodes if necessary. Thus, in the prior art, when a processor core needs to read a particular cache line, the processor core always broadcasts the read request to access the particular cache line first to the other processor cores that are included in the broadcasting processor core's node. This node is the local node with respective to the requesting processor core.

If the read request is not satisfied within the local node, the read request is then broadcast to all of the remote nodes so that the request can be satisfied within one of the remote nodes.

This two-step process reduces global traffic when a read request can be satisfied within the local node. When the read request can be satisfied within the local node, a global broadcast of the read request to the remote nodes is not necessary and is avoided. However, if none of the processor cores in the local node is able to satisfy the read request, the processor core then broadcasts the read request to the remaining nodes. These remaining nodes are the remote nodes.

FIG. 7 illustrates a high level flow chart that depicts broadcasting a read command to access particular data first to a local node and then broadcasting the command to remote nodes if a valid copy of the data is not found in the local node in accordance with the prior art. The process starts as depicted by block 700 and thereafter passes to block 702 which illustrates the particular processor core needing to read particular data. This is a read request.

Next, block 704 depicts the particular processor core first checking its own local cache to determine if the processor core is able to satisfy the request in its own cache. This is the cache that is included within the processor core that needs to access the particular data. Thereafter, block 706 illustrates a determination of whether or not the processor core was able to satisfy the read request within the processor core's own local cache. The read request is satisfied within the particular processor core's cache when a valid copy of the data is found within the processor core's cache. If a determination is made that the processor was able to satisfy the read request within its local cache, the process passes to block 708 which depicts satisfying the read request within the processor core's cache. The process then passes back to block 702.

Referring again to block 706, if a determination is made that the processor core was not able to satisfy the read request within its local cache, the process passes to block 710 which illustrates the read request being broadcast to all processor cores in only the node that includes this requesting particular processor core. This node is the local node with respect to the requesting particular processor core. Thus, the request is always broadcast first to only the local node.

Next, block 712 illustrates a determination of whether or not the processor core was able to satisfy the read request within the processor core's own local node. The read request is satisfied within the local node when a valid copy of the data is found within a cache within one of the other processor cores that are included in this processor core's local node. If a determination is made that the processor core was able to satisfy the read request within its local node, the process passes to block 714 which depicts satisfying the read request within the processor core's node. The process then passes to block 702.

Referring again to block 712, if a determination is made that the processor core was not able to satisfy the read request within its local node, the process passes to block 716 which illustrates the read request being broadcast to the remote nodes. Next, block 718 depicts satisfying the read request within a processor core that is included within one of the remote nodes. Thereafter, the process passes to block 702.

While this two-step read process described above reduces the global request traffic when a request can be satisfied within the local node, requests for data that is not located in the local node are delayed because the local node is always checked first.

Therefore, a need exists for a method, apparatus, and computer program product that provides an additional cache coherency protocol state that predicts the location of a shared memory block for reducing the number of unnecessarily broadcast local requests in order to conserve local communications bandwidth.

SUMMARY OF THE INVENTION

A method, apparatus, and computer program product are disclosed for reducing the number of unnecessarily broadcast local requests to reduce the latency to access data from remote nodes in an SMP computer system. A shared invalid cache coherency protocol state is defined that predicts whether a read request to read data in a shared cache line can be satisfied within a local node. When a cache line is in the shared invalid state, a valid copy of the data is predicted to be located in the local node. When a cache line is in the invalid state and not in the shared invalid state, a valid copy of the data is predicted to be located in one of the remote nodes.

Read requests to read data in a cache line that is not currently in the shared invalid state are broadcast first to remote nodes. Read requests to read data in a cache line that is currently in the shared invalid state are broadcast first to a local node, and in response to being unable to satisfy the read requests within the local node, the read requests are broadcast to the remote nodes.

The above as well as additional objectives, features, and advantages of the present invention will become apparent in the following detailed written description.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

FIG. 5 illustrates a high level flow chart that depicts a cache line transitioning between an invalid (I) state and a shared invalid (Isn) state in response to snooping particular memory access commands in accordance with the present invention;

FIGS. 6A and 6B depict a high level flow chart that illustrates utilizing a prediction of a current location of a valid copy of particular data when broadcasting read commands to read the data in accordance with the present invention; and FIG. 7 illustrates a high level flow chart that depicts broadcasting a read command to access particular data first to a local node and then broadcasting the command to remote nodes if a valid copy of the data is not found in the local node in accordance with the prior art.

DETAILED DESCRIPTION OF THE PREFERRED EMBODIMENT

Figure 1:
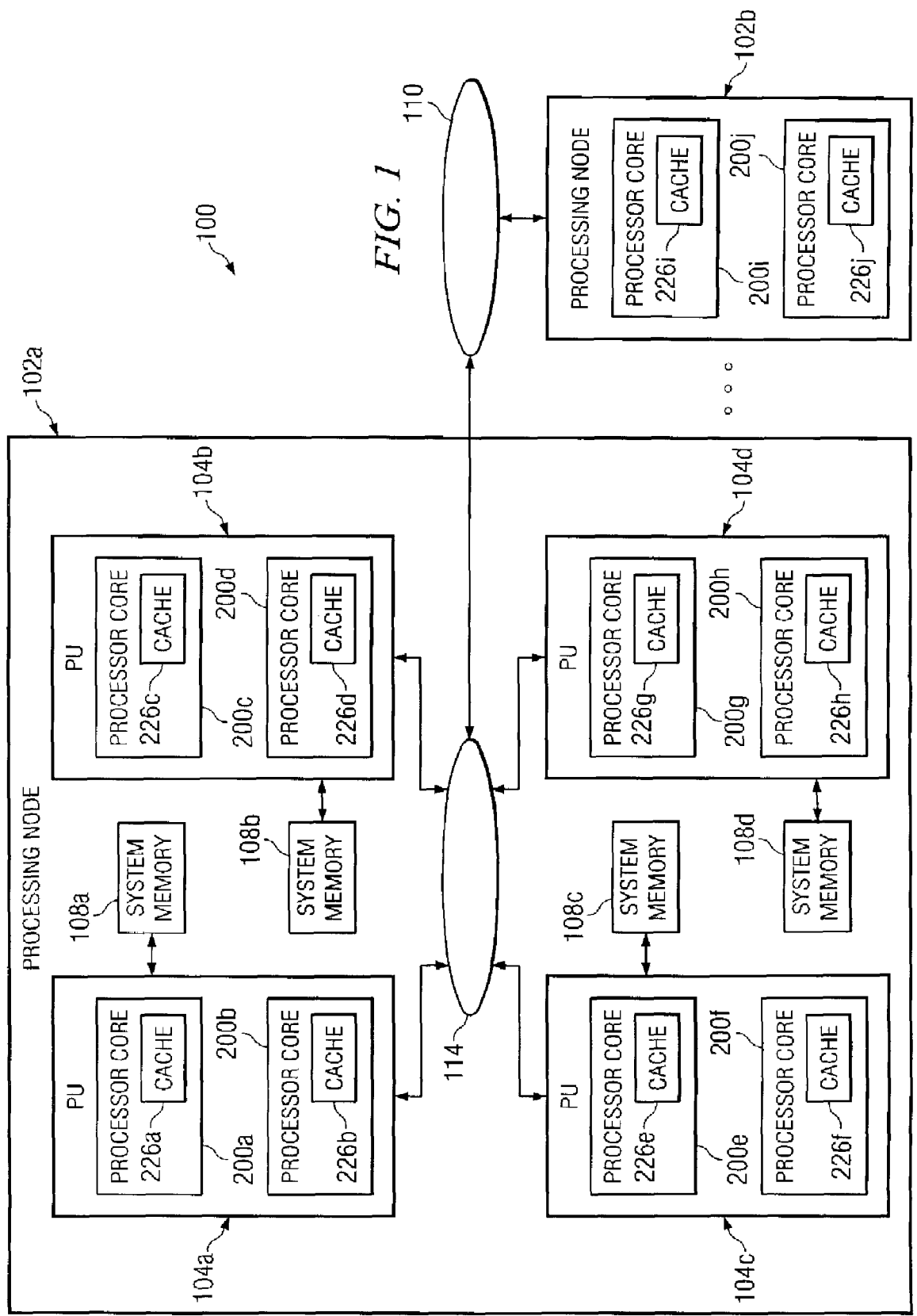
FIG. 1 is a high level block diagram of an exemplary embodiment of a cache coherent symmetric multiprocessor (SMP) data processing system in accordance with the present invention.

A preferred embodiment of the present invention and its advantages are better understood by referring to the figures, like numerals being used for like and corresponding parts of the accompanying figures.

The present invention is a method, apparatus, and computer program product that provides a new cache coherency protocol state that predicts the location of a shared memory block. This new cache coherency protocol state, a shared invalid state, can be used to predict whether a read request to access particular data can be satisfied within a local SMP node. Thus, the prediction is made as to the location of a valid copy of the particular data. When a cache line of the data is in the shared invalid state, a valid copy of the data is predicted to be located in a cache within the local node. When a cache line of the data is in the invalid state and not in the shared invalid state, a valid copy of the cache line is predicted to be located in a cache within one of the remote nodes.

When a valid copy of the particular data is predicted to be in the local node, read requests to that data are first broadcast to the processor cores in the local node. If no valid copy is found in the local node, i.e. the prediction was incorrect, the read request is then transmitted to the remote nodes.

When a valid copy of the particular data is not predicted to be in the local node, read requests to that data are first broadcast to the processor cores in the remote nodes. In this case, no broadcast is made first to only the local node. The prior art two-step read request process is reduced by the present invention to a single step when a valid copy of the data is predicted to be located in one of the remote nodes.

The present invention is a new, additional cache coherency state, Isn. According to the present invention, the new state, Isn, is added to the coherence protocol to reduce the global request bandwidth while not incurring significant additional request latency. The Isn state is similar to the prior art invalid (I) state in that it indicates that the cache line that is in the Isn, or I state, is invalid; however, in addition to indicating that that cache line is invalid, the Isn state also indicates that at least one cached valid copy of the data is likely to reside within the local SMP node.

The new Isn state is used instead of the conventional I state for some cache lines. When a cache line of data is in state "Isn", it is predicted that a valid copy of the data will be found in the local node. When a particular cache line is in state "I", it is predicted that a valid copy of the data will be found in one of the remote nodes and not within the local node.

Particular read requests to access data in a cache line that is currently in the Isn state are first broadcast to the local node because in the local node is where a valid copy of the data is predicted to be located. Read requests to access data in a cache line that is currently in the I state are first broadcast to remote nodes because in one of the remote nodes is where a valid copy of the data is predicted to be located. In this case where a cache line of the data is in the I state, the first step of broadcasting only to the local node is skipped.

The new Isn state is added to an existing write-invalidate cache coherence protocol in a clustered SMP computer system. This state is similar to the conventional I state in that it indicates the cache line that is in either the Isn or I state is potentially stale and may not be read or written without first acquiring a valid copy of the data. Cache lines in either the I or Isn state may be replaced in the cache to make room for valid data without an external request to replace the cache line.

Cache lines in a particular node enter the Isn state if the data of the cache line has been invalidated by a memory write request from a processor core in the same node, or if a read or write request is observed to the data of the cache line that is already in the I state from a processor in the same node. In these cases, it is inferred that at least one valid cached copy of the data resides in this local node.

Cache lines in a particular node are downgraded from the Isn state to the convention I state if a processor in a remote node requests to write the data of the cache line, or if a memory read request from a remote node (i.e. a remote read) is observed for which the corresponding snoop response indicates that the cache line will be in an exclusive (E) state.

A cache line will also be downgraded from the Isn state to the I state if a write-back request is observed of the data of this cache line, as this indicates a local copy is being replaced.

The Isn state is used when there is at least one cached copy of the data that resides in the local node. However, because this data is shared, there may be other copies of the data that reside in one or more remote nodes in addition to the one or more copies in the local node. Therefore, the Isn state can be used to reduce global traffic only for read commands, and not for write commands.

To effectively eliminate global traffic for write commands, a determination would need to be made that all of the shared cached copies reside locally with none residing in any of the remote nodes. If a determination is made that all cached copies of this shared data reside in the local node and the processor core's cached copy is in the Isn state, the memory access request to write to the data would need to be broadcast to only the local node. If a determination is made that either not all cached copies of this shared data reside in the local node or the processor core's cached copy is in the I state, the memory access request to write to the data would need to be broadcast to both the local node and the remote nodes.

Prior to describing the present invention in detail, the background of a computing environment that includes the present invention is described with reference to FIGS. 1, 2, and 3.

With reference now to the figures and, in particular, with reference to FIG. 1, there is illustrated a high level block diagram of an exemplary embodiment of a cache coherent symmetric multiprocessor (SMP) data processing system in accordance with the present invention. As shown, data processing system 100 includes multiple processing nodes 102a, 102b for processing data and instructions. Processing nodes 102a, 102b are coupled to a system interconnect 110 for conveying address, data, and control information. System interconnect 110 may be implemented, for example, as a bused interconnect, a switched interconnect, or a hybrid interconnect.

In the depicted embodiment, each processing node 102 is realized as a multi-chip module (MCM) containing four processing units 104a-104d, each preferably realized as a respective integrated circuit. The processing units 104a-104d within each processing node are coupled for communication by a local node interconnect, such as local interconnect 114, which, like system interconnect 110, may be implemented with one or more buses and/or switches.

The devices coupled to each local node interconnect 114 include not only processing units 104, but also one or more system memories 108a-108d. Data and instructions residing in system memories 108 can generally be accessed and modified by a processor core in any processing unit 104 in any processing node 102 of data processing system 100. In alternative embodiments of the invention, one or more system memories 108 can be coupled to system interconnect 110 rather than a local node interconnect 114.

Those skilled in the art will appreciate that SMP data processing system 100 can include many additional components that are not illustrated, such as interconnect bridges, non-volatile storage, ports for connection to networks or attached devices, etc. Because such additional components are not necessary for an understanding of the present invention, they are not illustrated in FIG. 1 or discussed further herein. It should also be understood, however, that the enhancements provided by the present invention are applicable to cache coherent data processing systems of diverse architectures and are in no way limited to the generalized data processing system architecture illustrated in FIG. 1.

Each processing node includes multiple processor cores that are local to that processing node. For example, processing node 102a includes processor cores 200a-h. Processing node 102b includes processor cores 200i-j.

Processor cores 200a-h are local processor cores with respective to one another. Processor cores 200i-j are local processor cores with respective to each another. Processor cores 200a-h are remote processor cores with respective to processor cores 200i-j. Processor cores 200i-j are remote processor cores with respective to processor cores 200a-h.

Each processor core includes within it a cache. The cache included within a processor core is considered that processor core's local cache. For example, processor core 200a includes cache 226a, processor core 200b includes cache 226b, processor core 200c includes cache 226c, processor core 200d includes cache 226d, processor core 200e includes cache 226e, processor core 200f includes cache 226f, processor core 200g includes cache 226g, processor core 200h includes cache 226h, processor core 200i includes cache 226i, and processor core 200j includes cache 226j.

If a processor core in node 102b, such as processor core 200i, needs to access particular data, processor core 200i first checks its cache 226i. If processor core 200i finds a cache line that is a copy of the data in cache 226i, processor core 200i determines the state of the cache line. If the cache line is in the Isn state and processor core 200i needs to read the cache line, processor core 200i broadcasts the read request to read the data to the processor cores that are local to processor core 200i. Thus, processor core 200i broadcasts the read request to processor core 200j because processor core 200j is within node 102b which is processor core's 200i local node.

If either no cache line is found within cache 226i or the cache line is in the I state, processor core 200i broadcasts the read request to read the data first to node 102a and node 102b.

Figure 2:
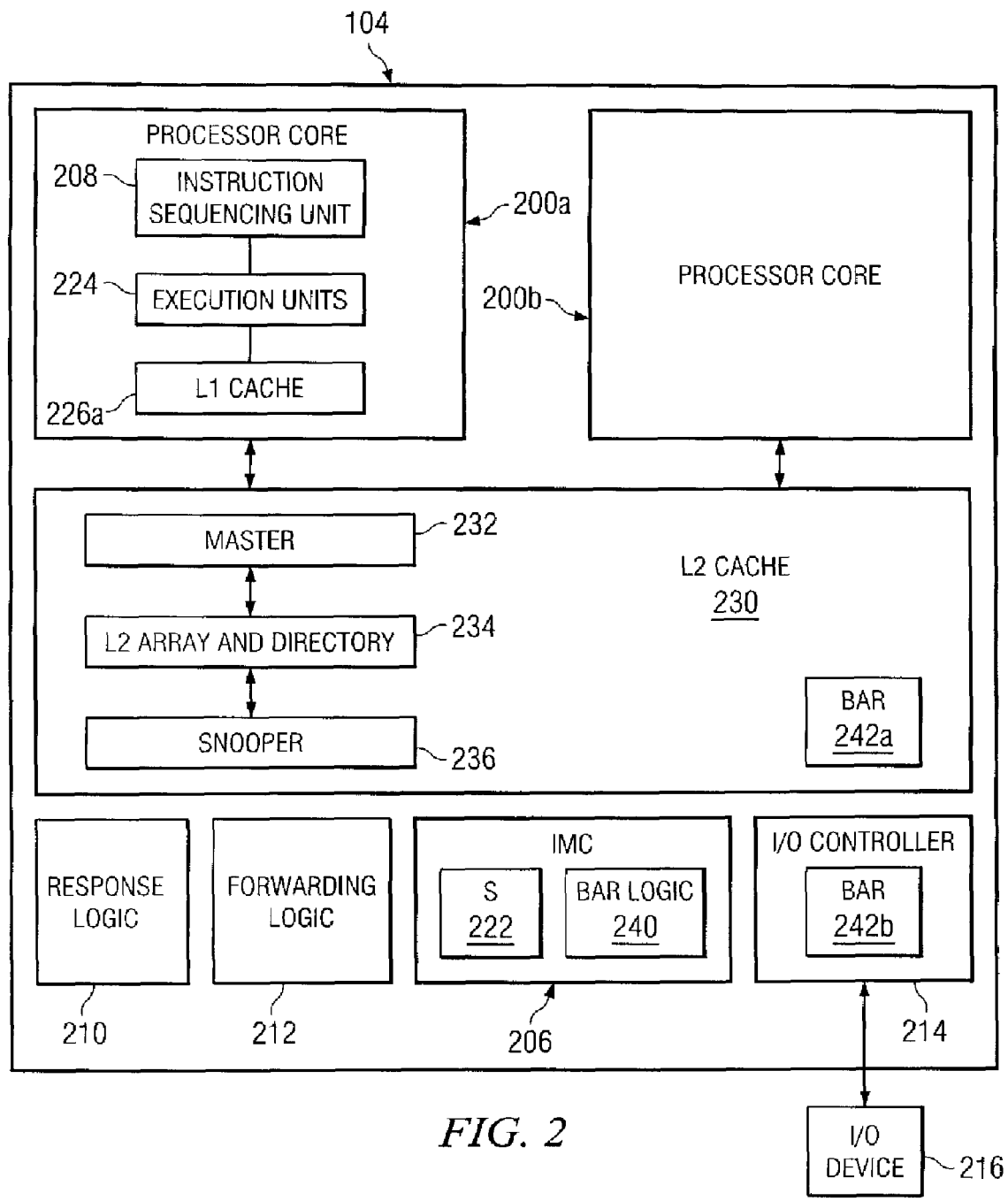
FIG. 2 is a more detailed block diagram of an exemplary processing unit in accordance with the present invention.

Referring now to FIG. 2, there is depicted a more detailed block diagram of an exemplary processing unit 104 in accordance with the present invention. In the depicted embodiment, each processing unit 104 includes two processor cores 200a, 200b for independently processing instructions and data. Each processor core 200 includes at least an instruction sequencing unit (ISU) 208 for fetching and ordering instructions for execution and one or more execution units 224 for executing instructions. The instructions executed by execution units 224 include instructions that request access to a memory block or cause the generation of a request for access to a memory block.

The operation of each processor core 200 is supported by a multi-level volatile memory hierarchy having at its lowest level shared system memories 108a-108d, and at its upper levels one or more levels of cache memory. In the depicted embodiment, each processing unit 104 includes an integrated memory controller (IMC) 206 that controls read and write access to a respective one of the system memories 108a-108d within its processing node 102 in response to requests received from processor cores 200a-200b and operations snooped by a snooper (S) 222 on the local node interconnect 114.

In the illustrative embodiment, the cache memory hierarchy of processing unit 104 includes a store-through level one (L1) cache 226 within each processor core 200 and a level two (L2) cache 230 shared by all processor cores 200a, 200b of the processing unit 104. L2 cache 230 includes an L2 array and directory 234, a master 232 and a snooper 236. Master 232 initiates transactions on local node interconnect 114 and system interconnect 110 and accesses L2 array and directory 234 in response to memory access (and other) requests received from the associated processor cores 200a-200b. Snooper 236 snoops operations on local node interconnect 114, provides appropriate responses, and performs any accesses to L2 array and directory 234 required by the operations.

Although the illustrated cache hierarchy includes only two levels of cache, those skilled in the art will appreciate that alternative embodiments may include additional levels (L3, L4, etc.) of on-chip or off-chip in-line or lookaside cache, which may be fully inclusive, partially inclusive, or non-inclusive of the contents the upper levels of cache.

Each processing unit 104 further includes an instance of response logic 210, which as discussed further below, implements a portion of the distributed coherency signaling mechanism that maintains cache coherency within data processing system 100. In addition, each processing unit 104 includes an instance of forwarding logic 212 for selectively forwarding communications between its local node interconnect 114 and system interconnect 110. Finally, each processing unit 104 includes an integrated I/C (input/output) controller 214 supporting the attachment of one or more I/O devices, such as I/O device 216. As described further below, I/O controller 214 may issue operations on local node interconnect 114 and/or system interconnect 110 in response to requests by I/O device 216.

Figure 3:
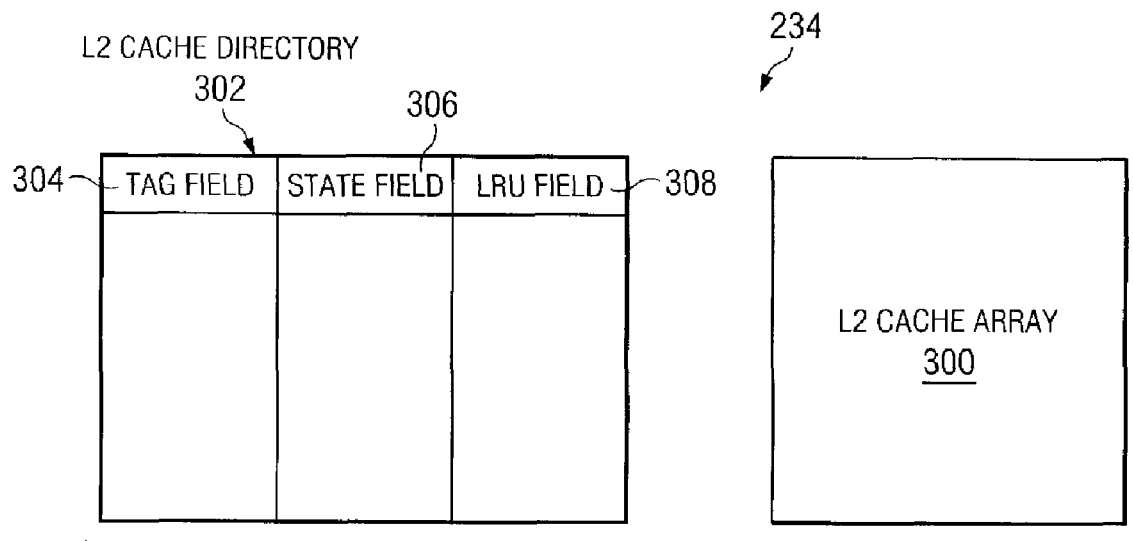
FIG. 3 is a more detailed block diagram of an exemplary embodiment of an L2 array and directory in accordance with the present invention.

With reference now to FIG. 3, there is illustrated a more detailed block diagram of an exemplary embodiment of L2 array and directory 234. As illustrated, L2 array and directory 234 includes a set associative L2 cache array 300 and an L2 cache directory 302 of the contents of L2 cache array 300. As in conventional set associative caches, memory locations in system memories 108 are mapped to particular congruence classes within cache arrays 300 utilizing predetermined index bits within the system memory (real) addresses. The particular cache lines stored within cache array 300 are recorded in cache directory 302, which contains one directory entry for each cache line in cache array 300. As understood by those skilled in the art, each directory entry in cache directory 302 comprises at least a tag field 304, which specifies the particular cache line stored in cache array 300 utilizing a tag portion of the corresponding real address, a state field 306, which indicates the coherency state of the cache line, and a LRU (Least Recently Used) field 308 indicating a replacement order for the cache line with respect to other cache lines in the same congruence class.

Figure 4:
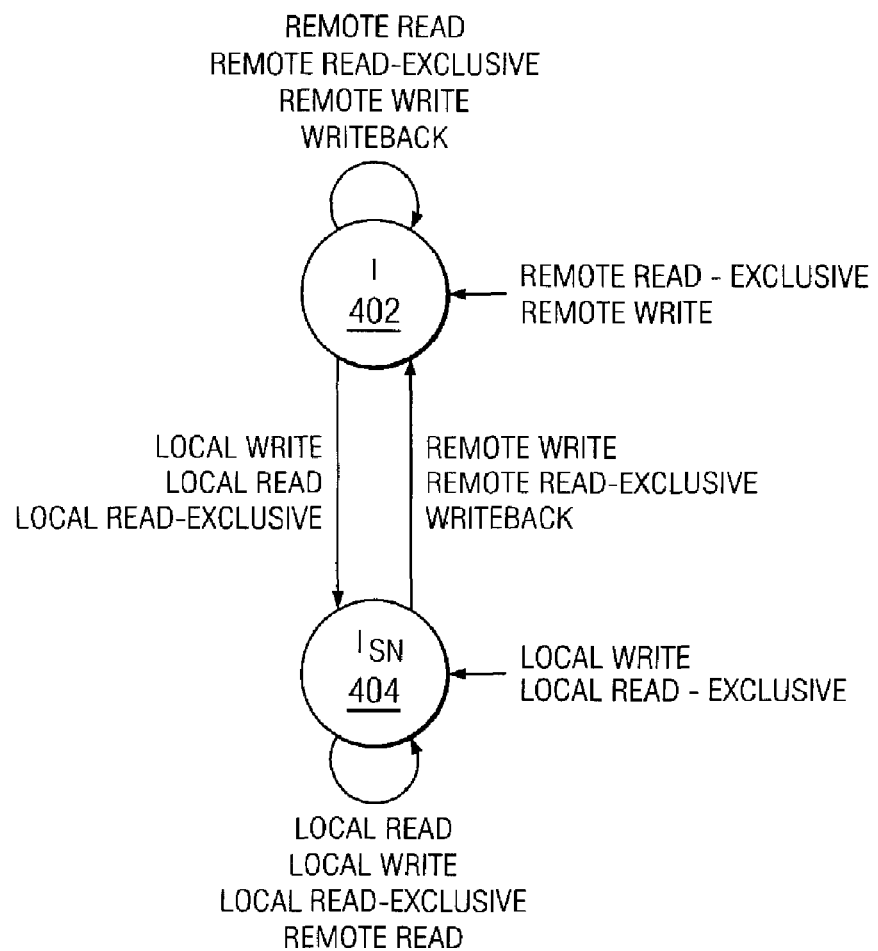
FIG. 4 depicts a state diagram that illustrates an invalid (I) state and a shared invalid (Isn) state and the transitioning of a cache line between those two states in accordance with the present invention.

FIG. 4 depicts a state diagram that illustrates an invalid (I) state 402 and a shared invalid (Isn) state 404 and the transitioning between those two states in accordance with the present invention.

A processor core transmits commands by broadcasting the command via a local node interconnect 114 to which the processor core is coupled. The commands are then placed on system interconnect 100 which then distributes the commands to a local node interconnect 114 within each other node. In this manner, each processor core within each node is able to snoop commands that are broadcast by all of the processor cores.

The Isn state is similar to the conventional invalid (I) state in that both Isn and I states indicate that the cache line that is in either state is potentially stale and may not be read or written without first acquiring a valid copy of the cache line.

Local commands are commands that come from a processor core within the snooping processor core's node. Remote commands are commands that come from a processor core that is not within the snooping processor core's node.

A write command is the result of the processor core executing a store instruction. A store instruction writes some particular data to a particular address in memory. A read command is the result of the processor core executing a load instruction. A load instruction reads the data in memory at a particular address into the processor core. A write-back is the writing of a cache line from a cache back to memory because it has been modified at some time. The write-back is done to make room in the cache for a different cache line of data that the processor core has requested.

A read-exclusive command is like a read in that it is put on the interconnect in response to the processor core executing a load instruction. However, it is different in that it is asking for an exclusive copy of the data. The result is that only the requesting processor core will end up with a copy of the data. All other copies will be invalidated (i.e. put in I or Isn state). In that sense it is like a write command. The read-exclusive command is used when it is likely that a store will be executed by the processor core doing the load to this cache line. By getting an exclusive copy on the load instruction, the subsequent store can then execute immediately rather than sending out an invalidate command (which works like a write command except it does not return data, so a distinction is not made between it and a write). There are a number of ways for the processor core to determine when to use a read command versus a read-exclusive command. For example, one way is by the particular type of load instruction.

Requests from a processor core to read data for which the cache state is Isn still require an external request to acquire the most up-to-date copy of the data, but these requests are likely to be satisfied by the local node, such that read requests may acquire the data without a costly global broadcast. The Isn state indicates that the data was recently cached by at least one other processor core in the local node, and is therefore likely to still be cached by a processor in the local node. A global broadcast may be avoided to conserve bandwidth.

As an example, there is a two-node SMP system running a program. A first cache line of data A is stored within a first node in a cache that is shared by all the processor cores in both nodes. When a processor core X in the first node requests to write to the first cache line, all other cache lines of data A are invalidated. However, the cache line copies of data A in the first node, which are local to processor core X, transition to the Isn state, while those in a second node, which are remote to processor core X, simply transition to the I state.

Should another processor core Y in the first node, which is local to processor core X, attempt to read data A next, a request need only be sent to the first node. The request will find the modified copy of data A in the first node, and obtain data A without any additional messages.

Conversely, if a processor core Z in the second node, which is remote to processor core X, attempts to read data A next, it will find a cache line in the I state in its cache, and the request will be immediately broadcast to both the first and second nodes. In this case, checking the second node first would have been a waste of time since processor core X holds the only valid copy of data A in the first node, which is remote to processor core Z. In response to this broadcast, any other processor cores in the second node, which is local to processor core I, with a cache line copy of data A in the I state can update to the Isn state.

FIG. 5 illustrates a high level flow chart that depicts transitioning between an invalid (I) state and a shared invalid (Isn) state in response to snooping particular memory access commands in accordance with the present invention. The process starts as depicted by block 500 and thereafter passes to block 502 which illustrates a processor core snooping from the interconnect a command that accesses a cache line that this processor core has in its own local cache within this processor core. The commands are determined to be either remote or local with respective to the node that includes this particular processor. Commands that were generated within the node that includes this processor core are local commands, while commands that were generated within a node other than the node that includes this processor core are remote commands.

Next, block 504 depicts a determination of whether or not the command is a remote write or remote read exclusive command. If the command is either a remote write or remote read-exclusive command, the process passes to block 506 which illustrates transitioning the cache line's state to the I state if the cache liners state is not already the I state. The process then passes to block 502.

Referring again to block 504, if a determination is made that the command is neither a remote write command nor remote read-exclusive, the process passes to block 508 which illustrates a determination of whether or not the command is a local write or local read-exclusive command. If a determination is made that the command is either a local write or a local read-exclusive command, the process passes to block 510 which depicts the cache line's state transitioning to the Isn state if the cache line is not already in the Isn state. The process then passes to block 502.

Referring again to block 508, if a determination is made that the command is neither a local write nor a local read-exclusive command, the process passes to block 512 which illustrates the processor core determining the current state of the cache line. Next, block 514 depicts a determination of whether the current state is the I state. If a determination is made that the current state is the I state, the process passes to block 516 which illustrates a determination of whether or not the snooped command is either a local read command or a local read-exclusive command. If a determination is made that the snooped command is either a local read command or a local read-exclusive command, the process passes to block 518 which depicts the cache line's state transitioning to the Isn state. The process then passes back to block 502. Referring again to block 516, if a determination is made that the snooped command is neither a local read nor a local read-exclusive command, the process passes back to block 502 and the cache line stays in the I state.

Referring again to block 514, if a determination is made that the current state is not the I state, the process passes to block 520 which illustrates the cache line's state currently being the Isn state. Next, block 522 depicts a determination of whether or not the snooped command is a remote read-exclusive command or a write-back command. If a determination is made that the command is either a remote read-exclusive command or a write-back command, the process passes to block 524 which illustrates the cache line's state transitioning to the I state. The process then passes back to block 502. Referring again to block 522, if a determination is made that the snooped command is neither a remote read-exclusive nor a write-back command, the process passes back to block 502 and the cache line stays in the Isn state.

Figure 6B:
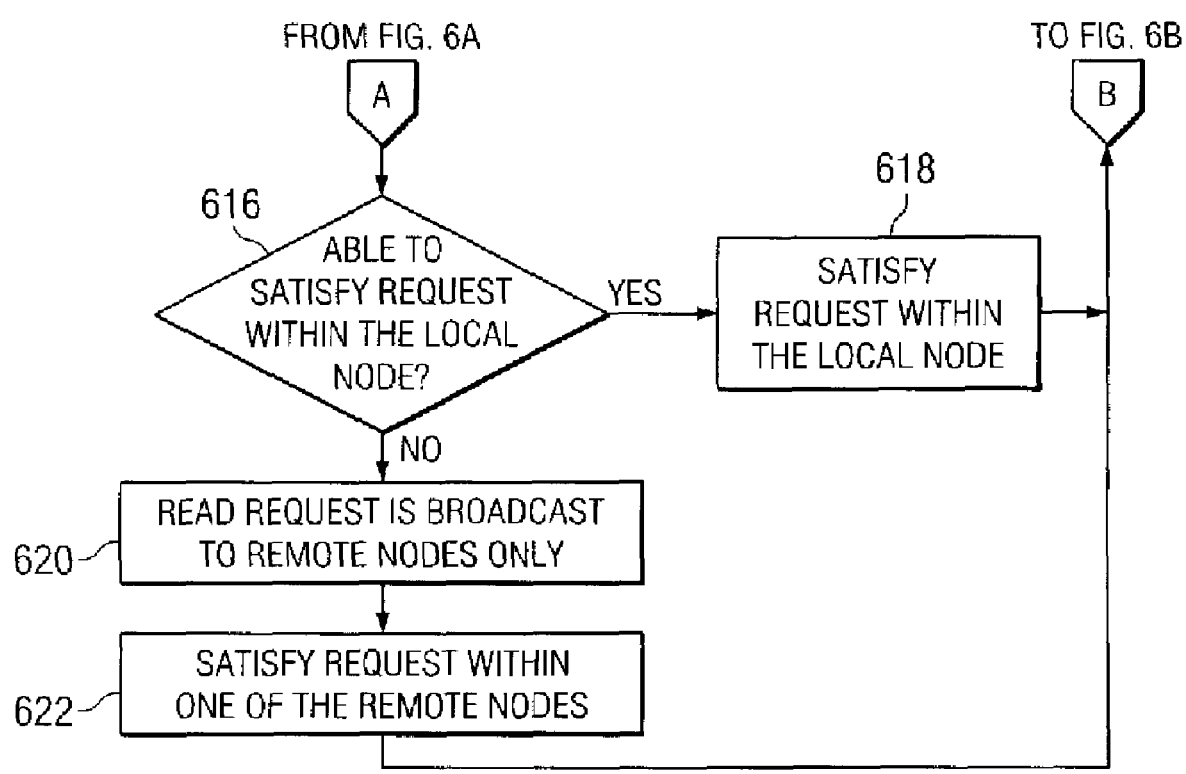

FIGS. 6A and 6B depict a high level flow chart that illustrates utilizing a prediction of a current location of a valid copy of particular data when broadcasting read commands to access the data in accordance with the present invention. The process starts as depicted by block 600 and thereafter passes to block 602 which illustrates the particular processor core needing to read particular data. This is a read request.

Next, block 604 depicts the particular processor core first checking its own local cache to determine if the processor core is able to satisfy the request in its own cache. If a cache line of this data is in the processor core's local cache, the processor core determines the current state of the cache line. Thereafter, block 606 illustrates a determination of whether or not the processor core was able to satisfy the read request within the processor core's own local cache. The read request is satisfied within the particular processor core's cache when the cache line is a valid copy of the data and is found within the processor core's cache. If a determination is made that the processor core was able to satisfy the read request within its local cache, the process passes to block 608 which depicts satisfying the read request within the processor core's cache. Next, block 610 illustrates transitioning the state of the cache line if necessary as described by FIGS. 4 and 5. The process then passes back to block 602. determination is made that the processor core was able to satisfy the read request within its local node, the process passes to block 618 which depicts satisfying the read request within the processor core's node. The process then passes to block 610.

Referring again to block 616, if a determination is made that the processor core was not able to satisfy the read request within its local node, the process passes to block 620 which illustrates the read request being broadcast to the remote nodes. Next, block 622 depicts satisfying the read request within a processor core that is included within one of the remote nodes. Thereafter, the process passes to block 610.

Referring again to block 612, if a determination is made that a cache line of the data is either not in the processor core's cache or a cache line of the data is in the cache and is in the I state, the process passes to block 624 which depicts the memory access request being broadcast concurrently to all nodes, both the local node and the remote nodes. Thereafter, block 626 illustrates satisfying the memory access request within a processor core that is included within one of the remote nodes or a processor core that is included within the local node. The process then passes to block 610.

The invention can take the form of an entirely hardware embodiment, an entirely software embodiment or an embodiment containing both hardware and software elements. In a preferred embodiment, the invention is implemented in software, which includes but is not limited to firmware, resident software, microcode, etc.

Furthermore, the invention can take the form of a computer program product accessible from a computer-usable or computer-readable medium providing program code for use by or in connection with a computer or any instruction execution system. For the purposes of this description, a computer-usable or computer readable medium can be any apparatus that can contain, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

The present invention has been described in the context of a fully functioning data processing system, those of ordinary skill in the art will appreciate that the processes of the present invention are capable of being distributed in the form of a computer readable medium of instructions and a variety of forms and that the present invention applies equally regardless of the particular type of signal bearing media actually used to carry out the distribution. Examples of computer readable media include recordable-type media, such as a floppy disk, a hard disk drive, a RAM, CD-ROMs, DVD-ROMs, and transmission-type media, such as digital and analog communications links, wired or wireless communications links using transmission forms, such as, for example, radio frequency and light wave transmissions. The computer readable media may take the form of coded formats that are decoded for actual use in a particular data processing system.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. An apparatus for reducing the number of unnecessarily broadcast local requests to reduce access latency when accessing data from remote nodes in an SMP computer system, said apparatus comprising:
    a local node that includes a plurality of local processors, each one of said local processors including a cache;
    a remote node that includes a plurality of remote processors, each one of said remote processors including a cache;
    a bus for coupling said local node to said remote node, said bus for transmitting requests between the local node and the remote node;
    a shared invalid cache coherency protocol state that predicts that a memory read request to read a cache line of particular shared data can be located within a cache that is included in said local node;
    a memory read request to read a cache line, of said data, that is not currently in said shared invalid state being broadcast concurrently to said local node and said remote node;
    a memory read request to read a cache line, of said data, that is currently in said shared invalid state being broadcast first to all caches in said local node;
    in response to being unable to locate said memory read request within a cache that is included in said local node, said memory read request being broadcast to said remote node;
    said first processor in the local node snooping a memory access request to access said data;
    said first processor determining whether a cache line of said data exists within a cache that is included in said first processor;
    in response to said first processor determining that said cache line of said data exists within said cache that is included in said first processor, said first processor determining whether said memory access request indicates that a valid copy of said data exists within said local node;
    in response to said cache line of said data existing within said cache in said first processor, said first processor determining a current protocol state of said cache line;
    in response to determining that said memory access request indicates that a valid copy of said data exists within said local node and said current protocol state being an invalid state, said first processor transitioning said current state of said cache line to said shared invalid state from said invalid state; and
    in response to determining that said memory access request indicates that no valid copies of said data exist within said local node and said current protocol state being a shared invalid state, said first processor transitioning said current state of said cache line to said invalid state from said shared invalid state.

2. The apparatus according to claim 1, further comprising:
    in response to a cache line of said data being in the shared invalid state, said shared invalid state predicting that a valid copy of said data is located in a cache in said local node; and
    in response to a cache line of said data being in an invalid state and not in said shared invalid state, said invalid state predicting that a valid copy of said data is located in a cache that is included in said remote node and not in said local node.

3. The apparatus according to claim 1, further comprising:
said first processor determining that said memory access request indicates that a valid copy of said data exists within said local node when said memory access request is a local write request.

4. The apparatus according to claim 1, further comprising:
said first processor determining that said memory access request indicates that a valid copy of said data exists within said local node when said memory access request is a local read request.

5. The apparatus according to claim 1, further comprising:
said first processor determining that said memory access request indicates that a valid copy of said data exists within said local node when said memory access request is a local read-exclusive request.

6. The apparatus according to claim 1, further comprising:
said first processor determining that said memory access request indicates that a valid copy of said data does not exist within said local node when said memory access request is a remote read-exclusive request.

7. The apparatus according to claim 1, further comprising:
said first processor determining that said memory access request indicates that a valid copy of said data does not exist within said local node when said memory access request is a remote write request.

8. A computer program product that is stored on a computer recordable medium, the computer program product comprising:
said computer recordable medium including computer usable program code for reducing the number of unnecessarily broadcast local requests to reduce access latency when accessing data from remote nodes in an SMP computer system, said computer program product including;
computer usable program code for defining a shared invalid cache coherency protocol state that predicts whether a memory read request to read a cache line of particular shared data can be satisfied within a local node;
computer usable program code for broadcasting a memory read request to read a cache line, of said data, that is not currently in said shared invalid state first to all nodes;
computer usable program code for broadcasting a memory read request to read a cache line, of said data, that is currently in said shared invalid state first to a local node;
in response to being unable to satisfy said memory read request within said local node, computer usable program code for broadcasting said memory read requests to said remote nodes;
computer usable program code for snooping, by a processor, a memory access request to access said data;
computer usable program code for determining whether a cache line of said data exists within said processor's local cache;
computer usable program code responsive to determining that said cache line of said data exists within said processor's local cache, for determining whether said memory access request indicates that a valid copy of said data exists within a local node that includes said processor;
computer usable program code responsive to said cache line of said data existing within said processor's local cache, for determining a current protocol state of said cache line;
computer usable program code responsive to determining that said memory access request indicates that a valid copy of said data exists within said local node and said current protocol state being an invalid state, for transitioning said current state of said cache line to said shared invalid state from said invalid state; and
computer usable program code responsive to determining that said memory access request indicates that no valid copies of said data exist within said local node and said current protocol state being a shared invalid state, for transitioning said current state of said cache line to said invalid state from said shared invalid state.

* * * * *